United States Patent [19]
Wagner et al.

[11] Patent Number: 5,848,746
[45] Date of Patent: Dec. 15, 1998

[54] LOAD REGULATING EXPANSION FIXTURE

[75] Inventors: Lawrence M. Wagner; Michael J. Strum, both of San Jose, Calif.

[73] Assignee: The Regents of the University of California, Oakland, Calif.

[21] Appl. No.: 586,129

[22] Filed: Jan. 16, 1996

[51] Int. Cl.⁶ .................................................. B23K 20/02
[52] U.S. Cl. ........................................... 228/44.3; 228/5.5
[58] Field of Search .................................... 228/44.3, 106, 228/235.1, 5.5

[56] References Cited

U.S. PATENT DOCUMENTS

| 3,110,961 | 11/1963 | Melill et al. | 228/106 X |
| 4,089,456 | 5/1978 | Toppen et al. | 228/235.1 |
| 4,204,628 | 5/1980 | Houston et al. | 228/106 |

FOREIGN PATENT DOCUMENTS

| 591285 | 2/1978 | U.S.S.R. | 226/106 |

OTHER PUBLICATIONS

Truhan et al, "Fabrication of Thin Beryllium Windows for X–Ray Applications", UCRL–83767, Lawrence Livermore Labratory, University of California, Livermore, Ca 94550, USA, Dec. 19, 1979.

*Primary Examiner*—Kenneth J. Ramsey
*Attorney, Agent, or Firm*—L. E. Carnahan

[57] ABSTRACT

A free standing self contained device for bonding ultra thin metallic films, such as 0.001 inch beryllium foils. The device will regulate to a predetermined load for solid state bonding when heated to a bonding temperature. The device includes a load regulating feature, whereby the expansion stresses generated for bonding are regulated and self adjusting. The load regulator comprises a pair of friction isolators with a plurality of annealed copper members located therebetween. The device, with the load regulator, will adjust to and maintain a stress level needed to successfully and economically complete a leak tight bond without damaging thin foils or other delicate components.

19 Claims, 1 Drawing Sheet

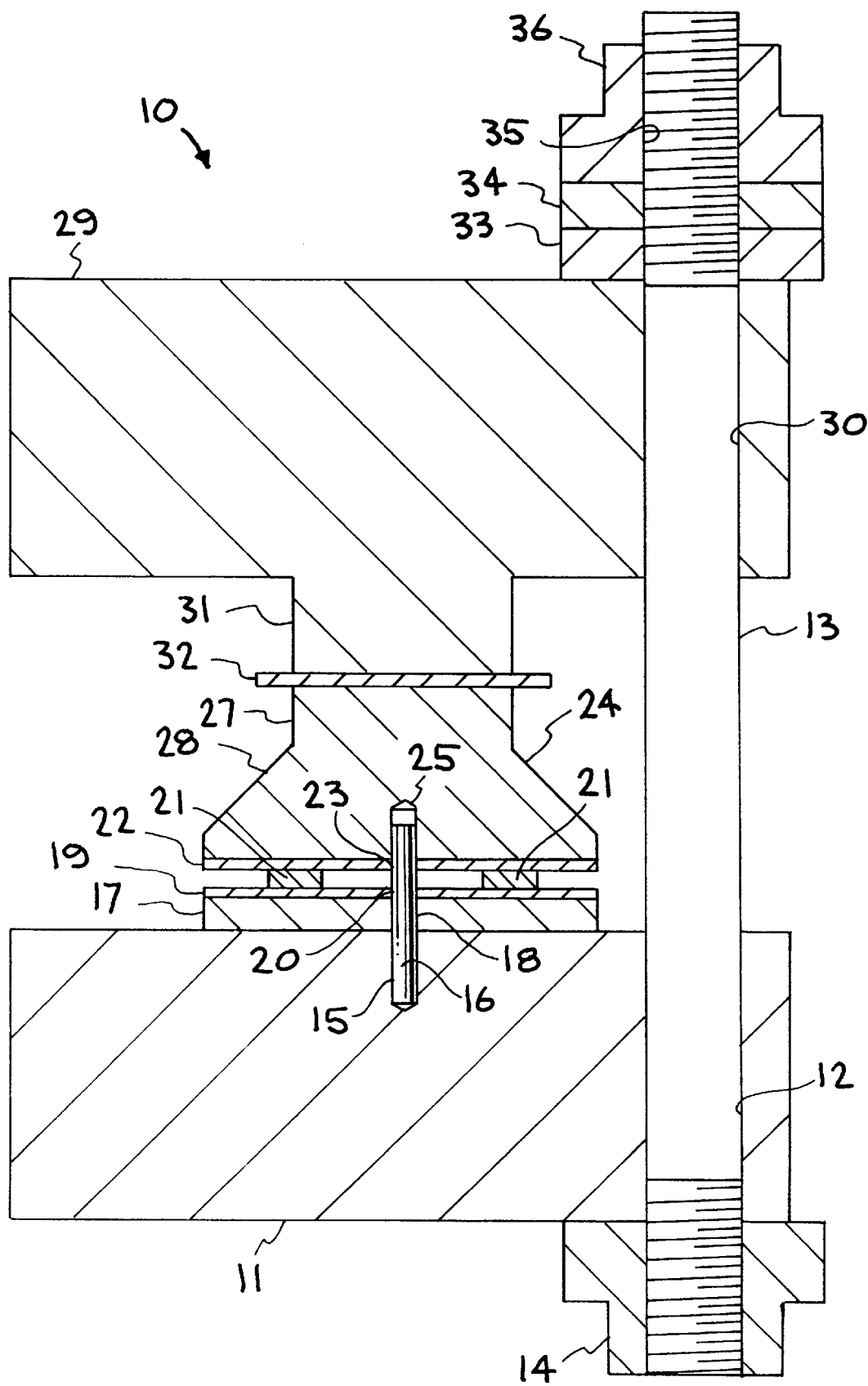

LOAD REGULATING EXPANSION FIXTURE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to solid state bonding of films and foils, particularly to a solid state bonding apparatus for ultra thin films and foils, and more particularly to a free standing fixture which incorporates load regulating that will produce all the necessary bonding stresses with virtually any good vacuum furnace.

The problem in joining ultra thin metallic films or foils by conventional brazing is that the brazing liquid will dissolve some of the foil or film and can cause it to fail in the process. Also, the high temperatures needed for conventional brazing may alter the film's quality and render it useless. High bonding temperatures also increase differential thermal expansion strains between the components to be joined, which may result in unacceptable distortions upon cool down after bonding. Using a solid state bonding process will allow lower joining temperatures and has no brazing liquid. A solid state bonding technique was developed to solid state bond ultra thin (0.001 inch) beryllium foils for x-ray applications. See UCRL-83767, "Fabricating Thin Film Beryllium Windows for X-Ray Applications", J.J. Truhan et al., Dec. 28, 1979. However, the equipment to carry out the thin film solid state bonding is very specialized and expensive ($100–$200K) and limits production rates (e.g. multiple fixtures cannot be readily used simultaneously).

The present invention overcomes the problems associated with the prior solid state bonding technique and involves a free standing, load regulating, fixture that will produce all the necessary bonding stresses with virtually any good vacuum furnace. The key component of this fixture is the addition of the load regulating feature which limits peak loads and provides repeatable loading levels. This is accomplished by the addition of annealed copper load regulators positioned between a pair of friction isolators located within a low expansion anvil positioned beneath the workpiece (film being bonded).

SUMMARY OF THE INVENTION

It is an object of the present invention to provide a solid state bonding fixture.

A further object of the invention is to provide a free standing self contained solid state bonding fixture having load regulating expansion.

A further object of the invention is to provide a free standing solid state bonding fixture which eliminates the necessity of an expensive dedicated, high vacuum, load maintaining, bonding press, and furnace.

Another object of the invention is to provide a free standing self contained solid state bonding fixture which includes a load regulating feature.

Another object of the invention is to provide a load regulator for an expansion solid state bonding fixture.

Another object of the invention is to provide an anvil of a solid state bonding fixture having a low coefficient of thermal expansion with a load regulator.

Another object of the invention is to provide a load regulator for a solid state bonding fixture utilizing isolated copper components in an anvil of the bonding structure.

Other objects and advantages of the present invention will become obvious from the following description and accompanying drawing. The invention is a free standing self contained device that will regulate to a predetermined load for solid state bonding when heated to the bonding temperature. This free standing fixture eliminates the necessity of an expensive, dedicated, high-vacuum, load maintaining, bonding press, and furnace. A key component of the fixture of this invention is a load regulating feature, which produces all the necessary bonding stresses with virtually any good vacuum furnace. By use of the load regulator, the expansion stresses generated for bonding successfully are regulated and self adjusting. This is accomplished by a single or a plurality of annealed copper members positioned between friction isolators, and located in an anvil of the fixture or any location supporting the bonding loads. While the invention enables solid state bonding of various thin films and foil, it has particular application in the bonding of ultra thin (0.001 inch) beryllium foil windows, such as used in x-ray detectors, x-ray tubes, and streak cameras.

BRIEF DESCRIPTION OF THE DRAWINGS

The accompanying drawing, which is incorporated into and forms a part of the disclosure, illustrates an embodiment of the invention and, together with the description, serves to explain the principles of the invention.

The single figure is a cross-sectional view of a section of an embodiment of the load regulating expansion solid state bonding fixture made in accordance with the present invention.

DETAILED DESCRIPTION OF THE INVENTION

The invention is directed to a free standing self contained fixture for solid state bonding utilizing a load regulator which will adjust to and maintain a stress level needed to successfully and economically complete a leak tight bond without damaging thin foils or other delicate components. The key component of the fixture is the addition of the load regulating feature. The fixture is particularly beneficial in the fabrication of ultra thin (0.001 inch) beryllium foil windows for x-ray tubes, x-ray detectors, and streak cameras.

A typical expansion fixture has two basic components: 1) a material with high coefficient of thermal expansion (CTE), and 2) a material with low CTE. At elevated temperatures the free expansion of the higher expanding material is restricted by low CTE material. Forces are generated by this differential expansion to compress a workpiece when placed between the high and low CTE components. This type of system is a brute force technique and not suitable for very delicate applications where load control is important. With a load regulator designed into the fixture, the expansion stresses generated for bonding successfully are regulated and self adjusting. The chemical composition and cross-sectional area of the load regulator is determined by the differential expansion strain, the bonding temperature, and the required bonding force. A solid state bonding fixture with the load regulator will adjust to and maintain a stress level needed to successfully and economically complete a leak tight bond without damaging thin (0.001 inch) foils or other delicate components. The fixture basically comprises three major components or sections composed of a table, a lower anvil assembly, and an upper anvil.

The drawing illustrates in cross-section an embodiment of a free standing self contained fixture for bonding thin films or foils. As shown, the fixture, generally indicated at 10, comprises a lower support member or table 11 of a high expansion material, such as 304 stainless steel, carbon steels, or nickel based alloys, is provided with three spaced apertures 12, only one shown, through which extends a bolt 13 having a nut 14 threaded thereon. The bolt 13 and nut 14 are of a low expansion material, such as molybdenum titanium, titanium alloys, or tungsten. Only one aperture 12, bolt 13, and nut 14 are shown, although a similar bolt and nut would be located in each of the three apertures of table or support member 11, which are equally spaced around the periphery of the table. Table 11 is provided with a centrally located opening 15 in which a pin 16 of low expansion material, such as molybdenum, is positioned. The lower anvil assembly which includes a load regulator is mounted on table 11 and comprises: a platen or plate 17 of low expansion material, such as molybdenum, having a central aperture 18, is positioned on table 11 such that pin 16 extends through aperture 18. A lower friction isolator 19, such as stainless steel, for example, may be used to provide repeatable load response by the load regulators. The friction isolator 19 having an aperture 20, is placed on platen 17 such that pin 16 extends through aperture 20. By way of example, the friction isolator 19 may be of any convenient thickness, typically 0.001 to 0.003 inch. A plurality of load regulators 21 of material, such as annealed copper, are positioned in spaced relation on isolator 19. While only two load regulators 21 are shown, four are used in this embodiment, and the load regulators 21 may have any convenient thickness, typically between 0.02 inch to 0.2 inch and more typically 0.064 inch and typically controlled in thickness to within ±0.002 inch. An upper friction isolator 22, such as stainless steel foil, having an aperture 23 is positioned on load regulators 21 with pin 16 extending through aperture 23. Isolator 22 may be of the same thickness as isolator 19. In the illustrated embodiment the isolators 19 and 22 are constructed of 0.002 inch thick 304 stainless steel. The four (4) copper load regulators 21 are formed from 0.250 inch diameter by 0.064 inch thick copper buttons annealed at 800° C./10 min. annealed vacuum. The copper buttons when operated at 600° C. will upset approximately 0.030 inch and support a 1000 pound load. The components 19, 21 and 22 comprise the load regulator. An anvil 24 of low expansion material, such as molybdenum, titanium, titanium alloys, or Kovar, having a central opening 25 therein is placed on upper friction isolator 22 such that pin 16 extends into opening 25. In this embodiment anvil 24 has a lower section 26 of the same diameter as platen 17 and a reduced diameter upper section 27 interconnected to lower section 26 by a tapered section 28. The components 17, 19, 21, 22 and 24 thus comprise the lower anvil assembly.

A top anvil 29, constructed of high expansion material, such as 304 stainless steel, carbon steel, or nickel-based alloys, having three apertures 30 there through only one shown, and a lower section 31 of a diameter equal to the diameter of upper section 27 of lower anvil 24 is positioned such that bolt 13 extends through aperture 30 and is adapted to be positioned on a workpiece 32, such as thin beryllium foil window, which is located on the upper section 27 of lower anvil 24. As described above, three bolts 13, only one shown, are utilized and thus, while not shown, top anvil 29 is provided with three apertures 30 which align with apertures 12 in table or support 11. A pair of load amplifiers 33 and 34, constructed of high expansion material, such as 304 stainless steel, carbon steel, or nickel-based alloys, are positioned over an upper threaded end 35 of bolt 13, and a nut 36, constructed of a low expansion material, such as molybdenum, titanium, titanium alloys, and tungsten, is threaded onto threaded end 35 of bolt 13. There being a set of two load amplifiers on each of the three bolts 13, while on one set is shown.

With a work piece 32 positioned on anvil 24 and anvil 29 lowered thereunto, as shown, the nuts 36 are firmly hand tightened on bolts 13, and the fixture 10 can then be placed in vacuum furnace, and a temperature controlling thermocouple is attached to the work piece 32 for a solid state bonding operation, such as bonding a 0.001 inch beryllium foil to a model mount for use in x-ray detectors. Tests carried out have shown that the fixture produces flat solid state bonded foil and a joint that is leak tight and structurally sound.

The solid state bonding fixture, illustrated in the drawing has the following features: 1) free standing, 2) has relative ease of assembly, 3) can be operated at 600° C., 4) produces a differential expansion of 0.030 inch, 5) generates an approximate 4000 lb. load (11 ksi over the given joint area), 6) has relative ease of disassembly, 7) has repairable work faces, and 8) is reusable. Also, with a work piece positioned between the anvils and placed in a vacuum furnace, the following bonding sequence for beryllium foils can be carried out: 1) vacuum at $10^{-6}$ Torr or better, 2) heat to 600° C. at constant ramp rate (30° C./min.), 3) hold at 600° C. for 45 min., 4) vacuum cool, 5) remove, and 6) leak check.

It has thus been shown that the present invention provides a free standing, load regulating expansion fixture for solid state bonding. This free standing tool will eliminate the necessity of an expensive, dedicated, high vacuum, load maintaining, bonding press and furnace, previously required to carry out effective solid state bonding of thin (0.001 inch) films and foils. Thus, the fixture of this invention enables relatively inexpensive solid state bonding of ultra thin beryllium foil windows for use in x-ray detectors, x-ray tubes and streak cameras.

While a particular embodiment, materials, parameters have been described and/or illustrated to exemplify and set forth the principles of the invention, such are not intended to be limiting. Modifications and change may become apparent to those skilled in the art, and it is intended that the invention be limited only by the scope of the appended claims.

The invention claimed is:

1. A free standing, differential expansion fixture for solid state bonding, comprising:

a table;

a lower anvil assembly mounted on said table;

an upper anvil; and means for removably retaining said upper anvil in alignment with said lower anvil assembly;

said lower anvil assembly being provided with plurality of a load regulators.

2. The expansion fixture of claim 1, wherein said load regulator includes a plurality of friction isolators having a plurality of metal members positioned therebetween.

3. The expansion fixture of claim 2, wherein said lower anvil assembly additionally includes a platen and an anvil, and wherein said load regulator is positioned between said platen and said anvil.

4. The expansion fixture of claim 1, wherein said lower anvil assembly additionally includes a platen and an anvil, said load regulator being positioned intermediate said platen and said anvil.

5. The expansion fixture of claim 4, wherein said platen and said anvil are constructed of a material of low coefficient of thermal expansion, and wherein said load regulator includes a plurality of friction isolators.

6. The expansion fixture of claim 5, wherein said lower anvil assembly is removably retained on said table by a pin arrangement.

7. The expansion fixture of claim 5, wherein said table and said upper anvil are constructed of a material of high coefficient of thermal expansion.

8. The expansion fixture of claim 1, wherein said means for removably retaining said upper anvil in alignment with said lower anvil assembly comprises a plurality of members securing said upper anvil to said table.

9. The expansion fixture of claim 8, wherein said plurality of members comprises a plurality of equally spaced bolts which extend through apertures in each of said table and said upper anvil.

10. The expansion fixture of claim 9, wherein said plurality of bolts are threaded at each end, and provided with a nut at each threaded end.

11. The expansion fixture of claim 8, wherein said plurality of members are constructed of a material of low coefficient of thermal expansion.

12. The expansion fixture of claim 11, additionally including a plurality of load amplifiers positioned on said upper anvil and retained by said plurality of members.

13. The expansion fixture of claim 1, additionally including a plurality of load amplifiers retained by said means for removably retaining said upper anvil in alignment with said lower anvil assembly.

14. The expansion fixture of claim 12, wherein said load amplifiers are constructed of a material of high coefficient of thermal expansion.

15. The expansion fixture of claim 1, wherein said load regulator includes a pair of spaced friction isolators constructed of stainless steel, and a plurality of annealed copper members positioned between said isolators.

16. A device for solid-state bonding of thin foils or films including a platen and a lower anvil, the improvement comprising:

a plurality of load regulators located intermediate said platen and lower anvil of said device.

17. The device of claim 16, wherein said plurality load regulators include a pair of spaced friction isolators and a plurality of metallic members positioned between said friction isolators.

18. The device of claim 16, wherein said platen, lower anvil, and load regulators are retained via a pin arrangement on a table of said device for solid state bonding.

19. The device of claim 16, wherein said platen, lower anvil, and load regulators are retained between an upper anvil and a table of said device for solid state bonding, with a work piece being adapted to be positioned between said lower anvil and said upper anvil.

* * * * *